(12) United States Patent
Wang et al.

(10) Patent No.: US 9,084,213 B2
(45) Date of Patent: Jul. 14, 2015

(54) METHOD AND DEVICE FOR OBTAINING TRANSMISSION POWER CONTROL (TPC) COMMAND

(75) Inventors: Yuren Wang, Shenzhen (CN); Qingping Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 174 days.

(21) Appl. No.: 13/823,303

(22) PCT Filed: Apr. 18, 2011

(86) PCT No.: PCT/CN2011/072959
§ 371 (c)(1),
(2), (4) Date: Mar. 14, 2013

(87) PCT Pub. No.: WO2012/034399
PCT Pub. Date: Mar. 22, 2012

(65) Prior Publication Data
US 2013/0190035 A1    Jul. 25, 2013

(30) Foreign Application Priority Data
Sep. 16, 2010  (CN) .......................... 2010 1 0284203

(51) Int. Cl.
*H04B 1/00*  (2006.01)
*H04W 52/54*  (2009.01)
*H04W 52/24*  (2009.01)
*H04W 52/08*  (2009.01)
*H04W 52/20*  (2009.01)
*H04W 52/36*  (2009.01)

(52) U.S. Cl.
CPC ............ *H04W 52/54* (2013.01); *H04W 52/241* (2013.01); *H04W 52/08* (2013.01); *H04W 52/20* (2013.01); *H04W 52/365* (2013.01)

(58) Field of Classification Search
CPC ... H04W 52/12; H04W 52/146; H04W 52/08; H04W 52/10; H04W 52/243; H04W 52/06; H04W 52/60; H04W 52/04; H04W 52/325; H04W 52/365
USPC .................................. 455/69, 522, 134, 135
See application file for complete search history.

(56) References Cited

U.S. PATENT DOCUMENTS

2007/0129096 A1*  6/2007  Okumura et al. ............. 455/522

FOREIGN PATENT DOCUMENTS

| CN | 1841958 A | 10/2006 |
| CN | 101141157 A | 3/2008 |
| CN | 101207415 A | 6/2008 |

OTHER PUBLICATIONS

International Search Report for International Application No. PCT/CN2011/072959, mailed Jul. 28, 2011 (4 pages).

(Continued)

*Primary Examiner* — Tu X Nguyen
(74) *Attorney, Agent, or Firm* — Clark & Elbing LLP

(57) ABSTRACT

The disclosure provides a method for obtaining a Transmission Power Control (TPC) command, relating to the field of wireless communications. The method comprises the following steps: presetting a Signal to Interference plus Noise Ratio (SINR) value threshold, wherein the SINR value threshold comprising a highest value HSINR, a median value MSINR, and a lowest value LSINR; comparing a current SINR value with a target SINR value to obtain a difference value ΔSINR; and comparing the ΔSINR with the SINR value threshold, and obtaining a TPC command according to a result of comparison. The disclosure also provides a device for obtaining a TPC command. By the method or device in the disclosure, the accuracy and instantaneity of obtaining a TPC command are improved.

12 Claims, 6 Drawing Sheets

(56) References Cited

OTHER PUBLICATIONS

International Preliminary Report on Patentability for International Application No. PCT/CN2011/072959, issued Mar. 19, 2013 (5 pages).

Written Opinion of the International Searching Authority for International Application No. PCT/CN2011/072959, mailed Jul. 28, 2011 (4 pages).

* cited by examiner

METHOD AND DEVICE FOR OBTAINING TRANSMISSION POWER CONTROL (TPC) COMMAND

CROSS-REFERENCE TO RELATED APPLICATIONS

This application is the U.S. National Stage filing under 35 U.S.C. §371 of International Application No. PCT/CN2011/072959, filed Apr. 18, 2011, which claims the benefit of Chinese Patent Application No. 201010284203.X, filed Sep. 16, 2010.

TECHNICAL FIELD

The disclosure relates to the technical field of wireless communications, in particular to a method and a device for obtaining a Transmission Power Control (TPC) command.

BACKGROUND

In an existing Long Term Evolution (LTE) system, network nodes mainly comprise a base station, User Equipment (UE) and a core network. Sending data to the UE from the base station is called downlink, and sending data to the base station from the UE is called uplink. For uplink, there are three channels: a Physical Random Access Channel (PRACH), a Physical Uplink Shared Channel (PUSCH) and a Physical Uplink Control Channel (PUCCH). Correspondingly, there are power calculation methods for the foregoing three channels; as a result, power control needs to be performed respectively for the three channels. The power control means that, in a mobile communication system, according to change of channels and a received signal level, via a feedback channel, the level of a transmitted signal is adjusted according to a certain control criterion, in order to decrease the overall interference level of the system. In an uplink in the LTE system, by means of the power control, path loss and shadow fading can be compensated, and interference between two multi-cell base stations can be decreased effectively; besides, by means of adjustment of the transmission power of mobile stations, the base station receives substantially equal signal power transmitted to the base station from all mobile stations in the cell, so that the near-far effect is overcome, and the transmission power of each mobile station is guaranteed to be most rational. Therefore, by means of the power control, the equipment energy can be saved, the service life of batteries can be prolonged, and the performance of cell edge users and the overall spectrum efficiency of the system also can be balanced.

In the current LTE system, two power control policies are employed, respectively: open-loop power control and closed-loop power control. In the open-loop power control, a TPC command sent by the base station side via a Downlink Control Information (DCI) is not changed, the UE side obtains a fixed power correction value via the TPC and determines an initial transmission power of the UE, to provide a basis for the closed-loop power control adjustment. The closed-loop power control further adjusts the power, the TPC command is employed to dynamically adjust the power correction value, as a compensation factor of power in order to control interference and meet conditions of channels. The closed-loop power control can apply to a PUSCH service channel and a PUCCH control channel. The open-loop power control does not need to feedback information, it can make quick response to the change of channels, and it has a relatively large dynamic adjustment range. The closed-loop power control can improve the precision of power adjustment, and it is an effective method to overcome asymmetric multi-path fading.

The closed-loop power control is implemented on the basis that the base station regularly sends a TPC command to the UE to feed back information, therefore, obtaining an accurate TPC command is a premise of excellent closed-loop power control, while the TPC command can be deduced from a Signal to Interference plus Noise Ratio (SINR) detected at the base station. In prior art, there is a method in which a current SINR value is compared with a preset target value and then a TPC command is selected according to a result of comparison, but the accuracy of the obtained TPC command is not high.

SUMMARY

The disclosure provides a method and a device for obtaining a TPC command, in order to improve the accuracy of obtaining a TPC command.

The disclosure provides a method for obtaining a TPC command, comprising the following steps:
presetting a Signal to Interference plus Noise Ratio (SINR) value threshold, wherein the SINR value threshold comprises a highest value HSINR, a median value MSINR, and a lowest value LSINR;
comparing a current SINR value with a target SINR value to obtain a difference value $\Delta$SINR;
comparing the $\Delta$SINR with the SINR value threshold, and obtaining a TPC command according to a result of comparison.

Preferably, the current SINR value is obtained according to following steps:
when a current service is a traffic service:
if a measured Frame Error Rate (FER) value is greater than a target FER value, adding the target FER value onto the target SINR value;
if the measured FER value is smaller than the target FER value, comparing a separated current PHR value and a preset target PHR value;
when a current PHR value is greater than the target PHR value, adding the target FER value onto the target SINR value; when the current PHR value is not greater than the target PHR value, subtracting the target FER value from the target SINR value.

Preferably, the current SINR value is obtained according to following steps:
when a current service is a voice service:
if a measured FER value is smaller than a target FER value, subtracting the target FER value from the target SINR value;
if the measured FER value is greater than the target FER value, adding the target FER value onto the target SINR value.

Preferably, obtaining the TPC command according to the result of the comparison comprises:
when a PHR value of UE is greater than 0:
if $\Delta$SINR$\geq$HSINR, determining the TPC command as 4;
if HSINR>$\Delta$SINR$\geq$MSINR, determining the TPC command as 1;
if MSINR>$\Delta$SINR$\geq$LSINR, determining the TPC command as −1;
if $\Delta$SINR<LSINR, determining the TPC command as −4;
if the PHR value of the UE approaches a maximum limit value, determining the TPC command as 1; if the PHR value of the UE does not approach the maximum limit value, comparing the $\Delta$SINR with the SINR value threshold, if $\Delta$SINR$\geq$LSINR, determining the TPC command as −1, if $\Delta$SINR<LSINR, determining the TPC command as −4;

when the PHR value of the UE is smaller than 0: comparing the $\Delta$SINR with the SINR value threshold, if $\Delta$SINR≥LSINR, determining the TPC command as −1, if $\Delta$SINR<LSINR, determining the TPC command as −4.

Preferably, obtaining the TPC command according to the result of the comparison comprises:

when a PHR value of UE is greater than 0:

if $\Delta$SINR≥HSINR, judging whether in an uplink power control information transmission state, if it is judged to be in the uplink power control information transmission state, determining the TPC command as 1, if it is judged to be not in the uplink power control information transmission state, determining the TPC command as 3;

if HSINR>$\Delta$SINR≥MSINR, determining the TPC command as 1;

if MSINR>$\Delta$SINR≥LSINR, determining the TPC command as 0;

if $\Delta$SINR<LSINR, determining the TPC command as −1;

if the PHR value of the UE approaches a maximum limit value, determining the TPC command as 0, if the PHR value of the UE does not approach the maximum limit value, determining the TPC command as −1.

Preferably, obtaining the TPC command according to the result of the comparison comprises:

if $\Delta$SINR≥HSINR, determining the TPC command as 3;

if HSINR>$\Delta$SINR≥MSINR, determining the TPC command as 1;

if MSINR>$\Delta$SINR≥LSINR, determining the TPC command as 0.

The disclosure provides a device for obtaining a Transmission Power Control (TPC) command, comprising:

a threshold setting module, configured to preset a Signal to Interference plus Noise Ratio (SINR) value threshold, wherein the SINR value threshold comprises a highest value HSINR, a median value MSINR, and a lowest value LSINR;

a difference value obtaining module, configured to compare a current SINR value with a target SINR value to obtain a difference value $\Delta$SINR; and a TPC command selection module, configured to compare the $\Delta$SINR with the SINR value threshold, and obtain a TPC command according to a result of comparison.

Preferably, the device further comprises an adder, a subtracter, a Power Headroom Report (PHR) separator and a PHR comparator, wherein the adder is configured to, when a current service is a traffic service, if a measured Frame Error Rate (FER) value is greater than a target FER value, add the target FER value onto the target SINR value;

the PHR separator is configured to, when the current service is the traffic service, if the measured FER value is smaller than the target FER value, separate a PHR value of User Equipment (UE);

the PHR comparator is configured to compare the PHR value and a preset target PHR value; the adder is further configured to, when a current PHR value is greater than the target PHR value, add the target FER value onto the target SINR value; the subtracter is configured to, when the current PHR value is smaller than the target PHR value, subtract the target FER value from the target SINR value.

Preferably, the device further comprises:

a subtracter, configured to, when a current service is a voice service, if a measured FER value is smaller than a target FER value, subtract the target FER value from the target SINR value;

an adder, configured to, when the current service is the voice service, if the measured FER value is greater than the target FER value, add the target FER value onto the target SINR value.

Preferably, the TPC command selection module is configured to:

when a PHR value of UE is greater than 0:

if $\Delta$SINR≥HSINR, determine the TPC command as 4;

if HSINR>$\Delta$SINR≥MSINR, determine the TPC command as 1;

if MSINR>$\Delta$SINR≥LSINR, determine the TPC command as −1;

if $\Delta$SINR<LSINR, determine the TPC command as −4;

if the PHR value of the UE approaches a maximum limit value, determine the TPC command as 1; if the PHR value of the UE does not approach the maximum limit value, compare the $\Delta$SINR with the SINR value threshold, if $\Delta$SINR≥LSINR, determine the TPC command as −1, if $\Delta$SINR<LSINR, determine the TPC command as −4;

when the PHR value of the UE is smaller than 0: compare the $\Delta$SINR with the SINR value threshold, if $\Delta$SINR≥LSINR, determine the TPC command as −1, if $\Delta$SINR<LSINR, determine the TPC command as −4.

Preferably, the TPC command selection module is configured to:

when a PHR value of UE is greater than 0:

if $\Delta$SINR≥HSINR, judge whether in an uplink power control information transmission state, if it is judged to be in the uplink power control information transmission state, determine the TPC command as 1, if it is judged to be not in the uplink power control information transmission state, determine the TPC command as 3;

if HSINR>$\Delta$SINR≥MSINR, determine the TPC command as 1;

if MSINR>$\Delta$SINR≥LSINR, determine the TPC command as 0;

if $\Delta$SINR<LSINR, determine the TPC command as −1;

if the PHR value of the UE approaches a maximum limit value, determine the TPC command as 0, if the PHR value of the UE does not approach the maximum limit value, determine the TPC command as −1.

Preferably, the TPC command selection module is configured to:

if $\Delta$SINR≥HSINR, determine the TPC command as 3;

if HSINR>$\Delta$SINR≥MSINR, determine the TPC command as 1;

if MSINR>$\Delta$SINR>LSINR, determine the TPC command as 0.

According to the method or device for obtaining a TPC command in the disclosure, by comparing the current SINR value with a target value to obtain an SINR difference value, and then comparing the SINR difference value with a highest threshold value of SINR, a median threshold value of SINR and a lowest threshold value of SINR in the channel, the TPC command can be adjusted flexibly according to practical situations, the direction for TPC command adjustment according to the SINR value is defined, the amount of computation is greatly reduced, and the accuracy and instantaneity of obtaining a TPC command are improved.

DETAILED DESCRIPTION OF THE EMBODIMENTS

It should be understood that, specific embodiments described herein are only used for explaining the disclosure, but not for limiting the disclosure.

Figure 1:
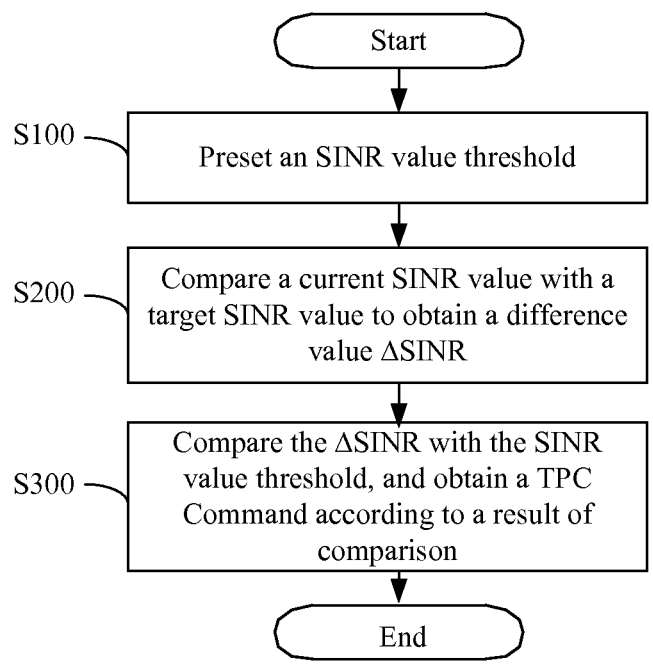
FIG. 1 is a flow chart of a method for obtaining a TPC command in an embodiment of the disclosure.

An embodiment of the disclosure provides a method for obtaining a TPC command, with reference to FIG. 1, the method specifically comprises the following steps.

Step S100: An SINR value threshold is preset, wherein the SINR value threshold comprises a highest value HSINR, a median value MSINR, and a lowest value LSINR. The setup of the SINR value threshold can be obtained by means of simulation, for example, a plurality of SINR values may be selected, and each SINR value is respectively loaded into an uplink in different operating environments, in order to select a highest value, a median value and a lowest value suitable for the operating of the uplink.

Step S200: A current SINR value is compared with a target SINR value to obtain a difference value $\Delta SINR$. The $\Delta SINR$ can be obtained and output by an SINR comparator.

Step S300: The $\Delta SINR$ is compared with the SINR value threshold, and a TPC command is obtained according to a result of comparison. The result of comparison of the difference value $\Delta SINR$ and the SINR value threshold can reflect the quality of a signal in the current uplink, for example, when the $\Delta SINR$ is greater than the HSINR value, it is indicated that the signal of the channel is in poor quality, at this moment, a TPC command of increasing a transmission power can be sent to the UE. In an embodiment, a TPC multi-path selector can be arranged at the output end of the SINR comparator, through the TPC multi-path selector, a TPC command is obtained according to the result of comparison.

According to the method for obtaining a TPC command in the embodiment of the disclosure, by comparing the current SINR value with a target value to obtain an SINR difference value, and then comparing the SINR difference value with the highest threshold value of SINR, the median threshold value of SINR and the lowest threshold value of SINR in the channel, the TPC command can be adjusted flexibly according to practical situations, the direction for TPC command adjustment according to the SINR value is defined, the amount of computation is greatly reduced, and the accuracy and instantaneity of obtaining a TPC command are improved.

Figure 2:
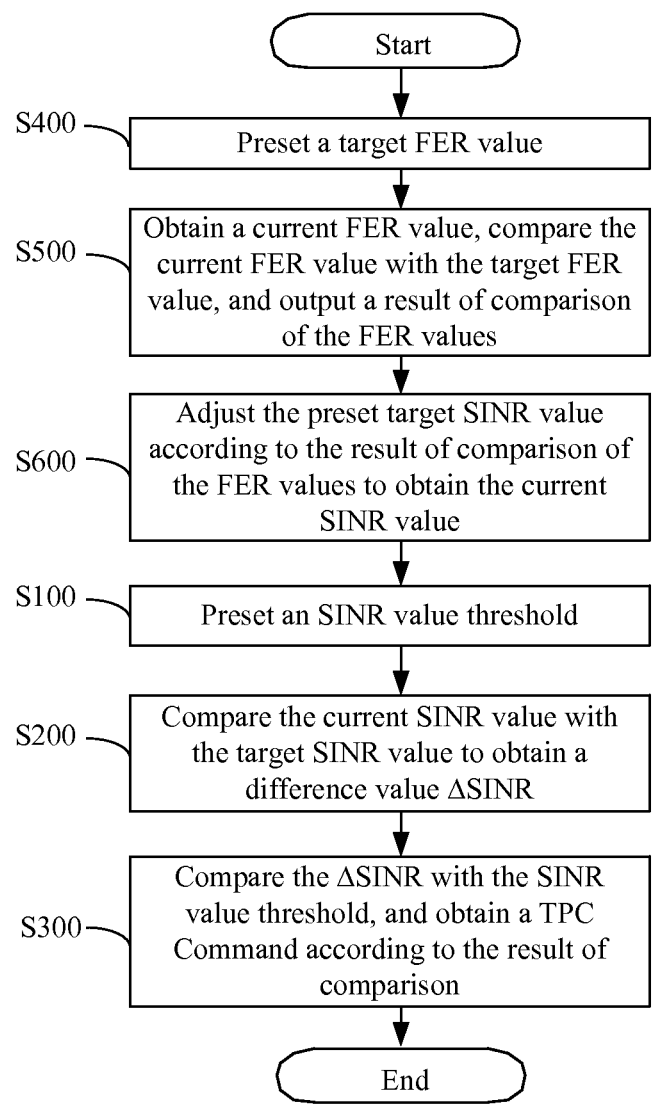
FIG. 2 is a flow chart for obtaining a current SINR value in an embodiment of the disclosure.

There are multiple of methods for obtaining the current SINR value, with reference to FIG. 2, in an embodiment of the disclosure, the current SINR value can be obtained according to the following steps.

Step S400: A target FER value is preset. An FER can reflect the quality of a signal sent by the UE, therefore it is an important parameter for the base station to adjust channel power. The base station can decide whether to add forward service channel power for the user according to the FER, or decide whether to allow the UE to add the transmission power. In the embodiment of the disclosure, there are many solutions for the target FER value, flexible selection can be made, for example, in one embodiment, the target FER value can be set as 0.1, which means that, there is one frame of data having error in ten frames of data.

Step S500: A current FER value is obtained and compared with the target FER value, and the result of comparison of the FER values is output. In an embodiment, the FER value fed back by the UE can be compared with the target FER value through an FER comparator.

Step S600: A preset target SINR value is adjusted according to the result of comparison of the FER values to obtain the current SINR value. As the basis of normal communication between the UE and the base station, the target SINR value can be set in a base station controller. In an embodiment, the target SINR value can be set to be modified once at regular intervals, for example, the target SINR value can be set to be modified once each 20 Transmission Time Intervals (TTI).

Mobile communication has various service types, such as a data traffic service and a voice service. A difference value between the current FER value and the target FER value indicates the quality of communications between the UE and the base station, and the current SINR value can be obtained according to the difference value. For example, step S600 may comprise:

when a current service is a traffic service:

if a measured FER value is greater than a target FER value, adding the target FER value onto the target SINR value;

if the measured FER value is smaller than the target FER value, comparing a separated current PHR value and a preset target PHR value;

when a current PHR value is greater than the target PHR value, adding the target FER value onto the target SINR value; when the current PHR value is not greater than the target PHR value, subtracting the target FER value from the target SINR value.

The traffic service is a data traffic service performed on the uplink of the UE. The PHR can be obtained by subtracting power used by the uplink channel currently from a maximum transmission power of the UE, and the PHR can reflect a current power adjustable range of the UE. When the base station side performs power adjustment or resource allocation for the UE, the PHR value should be considered to ensure that power required to perform the power adjustment or the resource allocation for the UE does not exceed the maximum transmission power of the UE, otherwise the accuracy of the power adjustment or the resource allocation performed by the base station for the UE will be influenced. Therefore, it is necessary to compare the PHR value with the target PHR value, so as to judge whether the power adjustment range is exceeded.

If the current PHR value is greater than the target PHR value, the target FER value is added onto the target SINR value; otherwise, the target FER value is subtracted from the currently saved target SINR value. If the current PHR value is greater than the target PHR value, the adjustment range is relatively large, thus a current SINR value greater than the target SINR value can be obtained.

An operation module comprising an adder and a subtracter may be arranged in the uplink, to receive the result of comparison of the FER values, and to operate according to the above operation way, so as to obtain the target SINR value.

When the current service is a voice service:

if a measured FER value is smaller than a target FER value, subtracting the target FER value from the target SINR value;

if the measured FER value is greater than the target FER value, adding the target FER value onto the target SINR value.

When a telephone service is performed, if a currently measured FER value is smaller than the target FER value, it is indicated that the quality of the signal is better than the quality of the signal in normal communications, the transmission power of the UE can be decreased, therefore, the target FER value can be subtracted from the target SINR value to obtain a current SINR value smaller than the target SINR value, so as to decrease the transmission power of the UE, thereby saving electricity consumption.

In the embodiment of the disclosure, obtaining the current SINR value through the above steps is simple and reliable.

Figure 3:
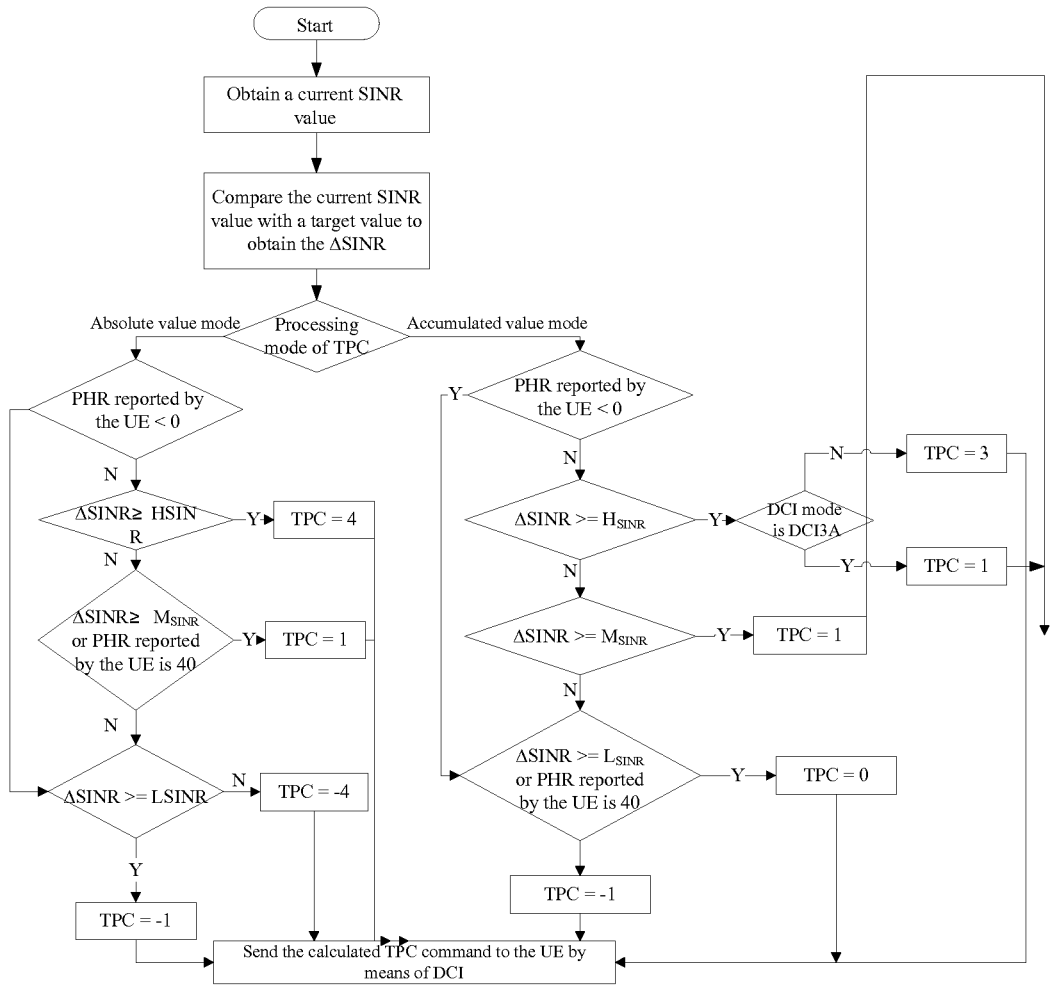
FIG. 3 is a flow chart of a method for obtaining a TPC command in a PUSCH channel in an embodiment of the disclosure.

FIG. 3 illustrates a detailed flow for obtaining a TPC command in a PUSCH channel in an embodiment of the disclosure. As it is necessary to distinguish a processing mode of the TPC command for the PUSCH channel, the processing mode is classified as an absolute value mode and an accumulated value mode, wherein the absolute value mode is aimed at the current transmission power, while the accumulated value mode is aimed at the historic transmission power and is used for fine-tuning the transmission power. Under the two modes, the adjustment of the TPC command is closely related to the PHR value reported by the UE, if the PHR value reported by the UE is greater than 0, it is indicated that the transmission power of the UE is relatively small, at this moment, the power cannot be decreased any more, if the PHR value reported by the UE is smaller than 0, it is indicated that the current transmission power of the UE has already reached the maximum value, the power cannot be increased any more. As shown in FIG. 3, in the absolute value mode, the flow further comprises:

when the PHR value of the UE is greater than 0:

if $\Delta SINR \geq HSINR$, the TPC command is 4; when $\Delta SINR \geq HSINR$, it is indicated that an absolute value of the difference value between the current SINR in the channel and the target SINR is greater than or equal to the highest SINR threshold value and the quality of the signal in the channel is relatively poor, therefore a TPC command with a bit value of 4 can be sent to the UE, so that the UE increases the transmission power greatly according to the TPC command;

if $HSINR > \Delta SINR \geq MSINR$, the TPC command is 1; when $HSINR > \Delta SINR \geq MSINR$, it is indicated that the absolute value of the difference value between the current SINR in the channel and the target SINR is between the highest threshold value and the median threshold value and the quality of the signal is fair, therefore a TPC command with a bit value of 1 can be sent to the UE, so that the UE increases the transmission power slightly according to the TPC command;

if $MSINR > \Delta SINR \geq LSINR$, the TPC command is −1; when $MSINR > \Delta SINR \geq LSINR$, it is indicated that the absolute value of the difference value between the current SINR in the channel and the target SINR is between the lowest threshold value and the median threshold value and the communication is relatively good, therefore a TPC command with a bit value of −1 can be sent to the UE, so that the UE decreases the transmission power according to the TPC command;

if $\Delta SINR < LSINR$, the TPC command is −4; $\Delta SINR < LSINR$ means that the absolute value of the difference value between the current SINR in the channel and the target SINR is smaller than the lowest threshold value and the signal is relatively strong, therefore a TPC command with a bit value of −4 can be sent to the UE, so that the UE decreases the transmission power according to the TPC command.

Further, the absolute value mode may further comprise:

if the PHR value of the UE approaches a maximum limit value, the TPC command is 1; otherwise, the $\Delta SINR$ is compared with the SINR value threshold, if $\Delta SINR \geq LSINR$, the TPC command is −1, if $\Delta SINR < LSINR$, the TPC command is −4. The range of the PHR value is between −23 to +40, when the PHR value approaches or is equal to 40, it is indicated that the transmission power of the UE has been very small, approaching to 0, at this moment, the transmission power cannot be decreased any more; when the PHR value does not approach 40, the transmission power can be decreased.

Further, the absolute value mode may further comprise:

when the PHR value of the UE is smaller than 0, the $\Delta SINR$ is compared with the SINR value threshold, if $\Delta SINR \geq LSINR$, the TPC command is −1, if $\Delta SINR < LSINR$, the TPC command is −4.

In the accumulated value mode, the flow further comprises:

when the PHR value of the UE is greater than 0:

if $\Delta SINR \geq HSINR$, whether in an uplink power control information transmission state is judged, if it is judged to be in the uplink power control information transmission state, the TPC command is 1, if it is judged to be not in the uplink power control information transmission state, the TPC command is 3; the uplink power control information transmission state may be expressed by DCI3A;

if $HSINR > \Delta SINR \geq MSINR$, the TPC command is 1;

if $MSINR > \Delta SINR \geq LSINR$, the TPC command is 0;

if $\Delta SINR < LSINR$, the TPC command is −1.

In the accumulated value mode, the obtaining of the TPC command is similar to that in the absolute value mode and will not be described in details herein.

Further, the accumulated value mode may further comprise:

if the PHR value of the UE approaches a maximum limit value, the TPC command is 0, if the PHR value of the UE does not approach the maximum limit value, the TPC command is −1.

Figure 4:
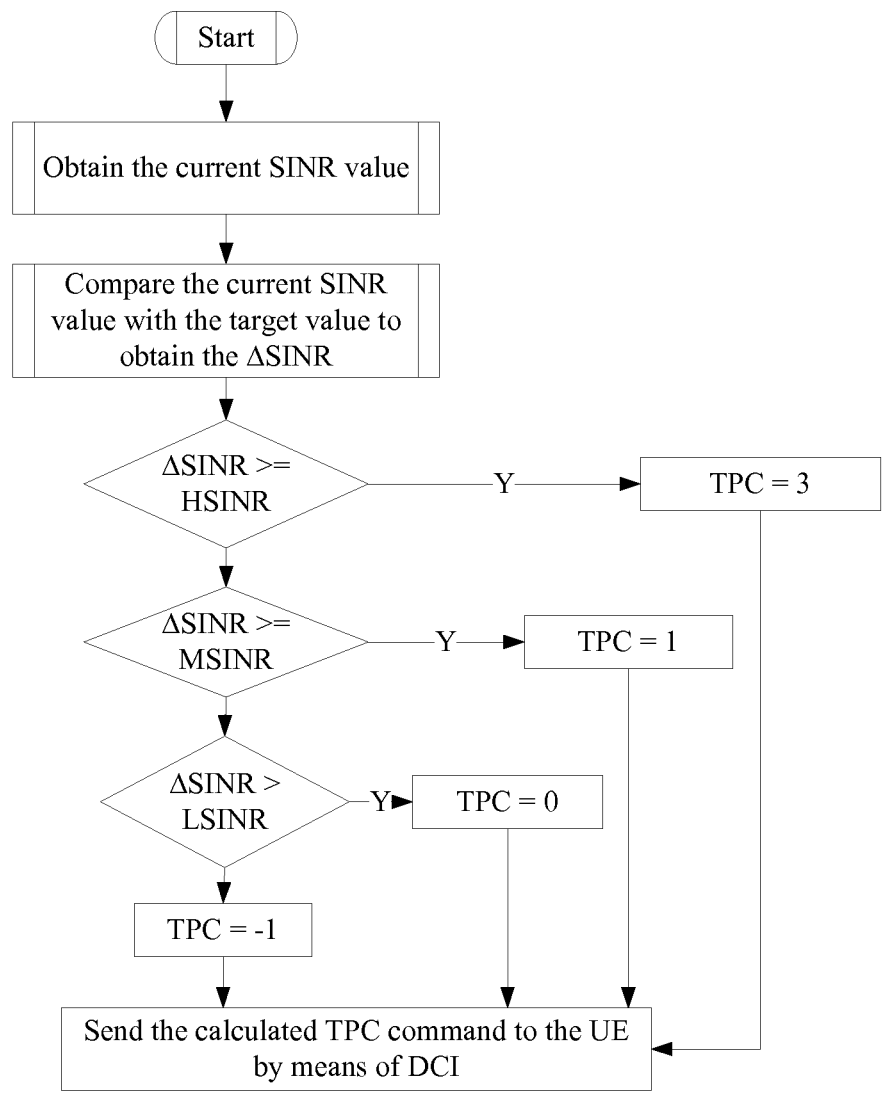
FIG. 4 is a flow chart of a method for obtaining a TPC command in a PUCCH channel in an embodiment of the disclosure.

FIG. 4 illustrates a detailed flow for obtaining a TPC command in a PUCCH channel in an embodiment of the disclosure, and the flow comprises:

if $\Delta SINR \geq HSINR$, the TPC command is 3;

if $HSINR > \Delta SINR \geq MSINR$, the TPC command is 1;

if $MSINR > \Delta SINR \geq LSINR$, the TPC command is 0.

As the PUCCH channel only involves the transmission of UCI information, there is no judgment flow of the PHR, the calculation flow of $\Delta SINR$ is consistent, and the only difference is that the TPC command obtained according to the difference value is different.

Figure 5:
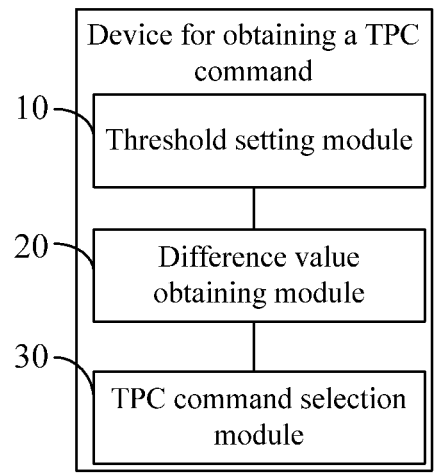
FIG. 5 is a structure diagram of a device for obtaining a TPC command in an embodiment of the disclosure.

With reference to FIG. 5, a structure diagram of a device for obtaining a TPC command in an embodiment of the disclosure is illustrated. The device comprises modules as follows.

A threshold setting module 10 is configured to preset an SINR value threshold, wherein the SINR value threshold comprises a highest value HSINR, a median value MSINR, and a lowest value LSINR. For example, a plurality of SINR values may be selected, and each SINR value is respectively loaded into an uplink in different operating environments, in order to select a highest value, a median value and a lowest value suitable for the operating of the uplink through the threshold setting module 10.

A difference value obtaining module 20 is configured to compare a current SINR value with a target SINR value to obtain a difference value $\Delta SINR$. In one embodiment, the difference value obtaining module 20 may be an SINR comparator.

A TPC command selection module 30 is configured to compare the $\Delta SINR$ with the SINR value threshold, and obtain a TPC command according to a result of comparison. The difference value $\Delta SINR$ can reflect the quality of a signal in the current uplink, for example, when the current SINR value is greater than the target SINR value, it is indicated that the signal of the channel is in poor quality, at this moment, a TPC command of increasing the transmission power can be sent to the UE through the TPC command selection module 30. In an embodiment, the TPC command selection module 30 may be a TPC multi-path selector, which can be arranged at the output end of the SINR comparator, to obtain a TPC command according to the result of the comparison.

Figure 6:
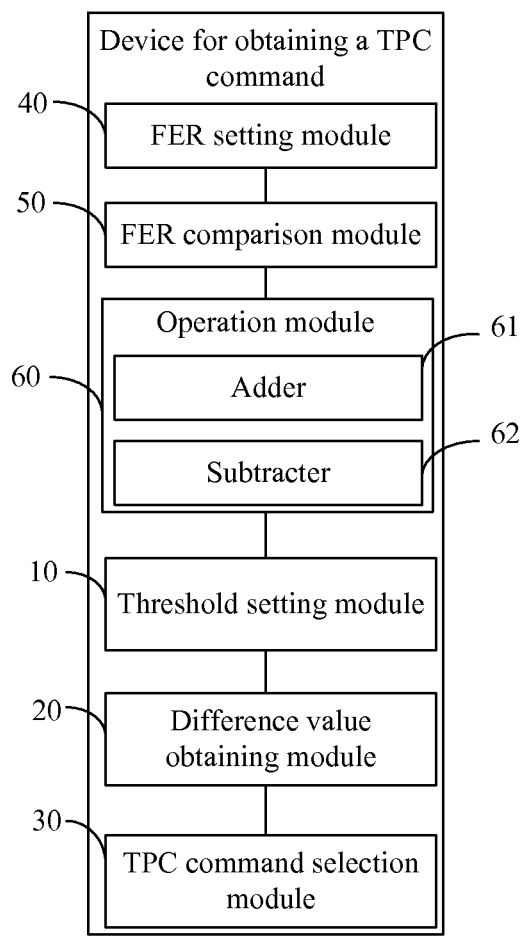
FIG. 6 is a structure diagram of a device for obtaining a TPC command in an embodiment of the disclosure.

There are many devices for obtaining the current SINR value, with reference to FIG. 6, in an embodiment of the disclosure, the following modules may be arranged in the device for obtaining the TPC command to obtain the current SINR value.

An FER setting module 40 is configured to preset a target FER value. An FER is an important parameter for the base station to adjust the channel power, the base station decides whether to add forward service channel power for the user according to the FER, or decide whether to allow the UE to add the transmission power. In the embodiment of the disclosure, there are many solutions for the target FER value, flexible selection can be made, for example, in one embodiment, the target FER value can be set as 0.1, which means that, there is one frame of data having error in ten frames of data.

An FER comparison module 50 is configured to obtain a current FER value and compare the current FER value with the target FER value, and output a result of comparison of the FER values. In an embodiment, the FER comparison module 50 may be an FER comparator arranged in the uplink to compare the FER value fed back by the UE with the target FER value.

An operation module 60 is configured to adjust the preset target SINR value according to the result of comparison of the FER values to obtain the current SINR value. As the basis of normal communication between the UE and the base station, the current SINR value can be set in a base station controller. In an embodiment, the target SINR value can be set to be modified once at regular intervals, for example, the target SINR value can be set to be modified once each 20 TTIs. An adder 61 and a subtracter 62 are set in the operation module 60, and the current SINR value is obtained by doing addition or subtraction on the target SINR value.

Figure 7:
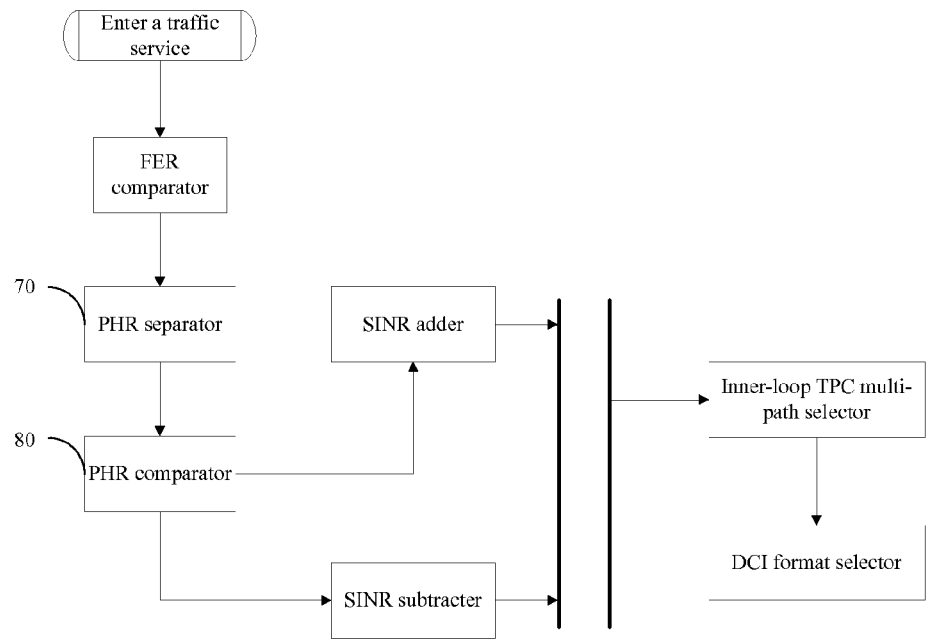
FIG. 7 is a structure diagram of a device for obtaining a current SINR value in an embodiment of the disclosure.

With reference to FIG. 7, in an embodiment, the device for obtaining a TPC command may further comprise a PHR separator 70 and a PHR comparator 80. The PHR separator 70 may be configured to, when a current service is a traffic service and a measured FER value is smaller than a target value, separate a PHR value reported by the UE in the current channel. The PHR comparator 80 is configured to compare the PHR value with the target PHR value. The PHR can be obtained by subtracting power used by the uplink channel currently from a maximum transmission power of the UE, and the PHR can reflect a current power adjustable range of the UE. When the base station side performs power adjustment or resource allocation for the UE, the PHR value should be considered to ensure that power required to perform the power adjustment or the resource allocation for the UE does not exceed the maximum transmission power of the UE, otherwise the accuracy of the power adjustment or the resource allocation performed by the base station for the UE will be influenced. Therefore, it is necessary to set the PHR separator 70 to separate the power headroom, and set the PHR comparator 80 to compare the PHR value with the target PHR value, so as to judge whether the power adjustment range is exceeded.

The adder 61 is further configured to, if the current PHR value is greater than the target PHR value, add the target FER value onto the target SINR value, to obtain the current SINR value;

the subtracter 62 is further configured to, if the current PHR value is smaller than the target PHR value, subtract the target FER value from the currently saved target SINR value, to obtain the current SINR value.

In an embodiment, the adder 61 is further configured to, when the current service is a traffic service and the measured FER value is greater than the target FER value, add the target FER value onto the target SINR value.

The device for obtaining the SINR value in the embodiment can be aimed at the traffic service.

Figure 8:
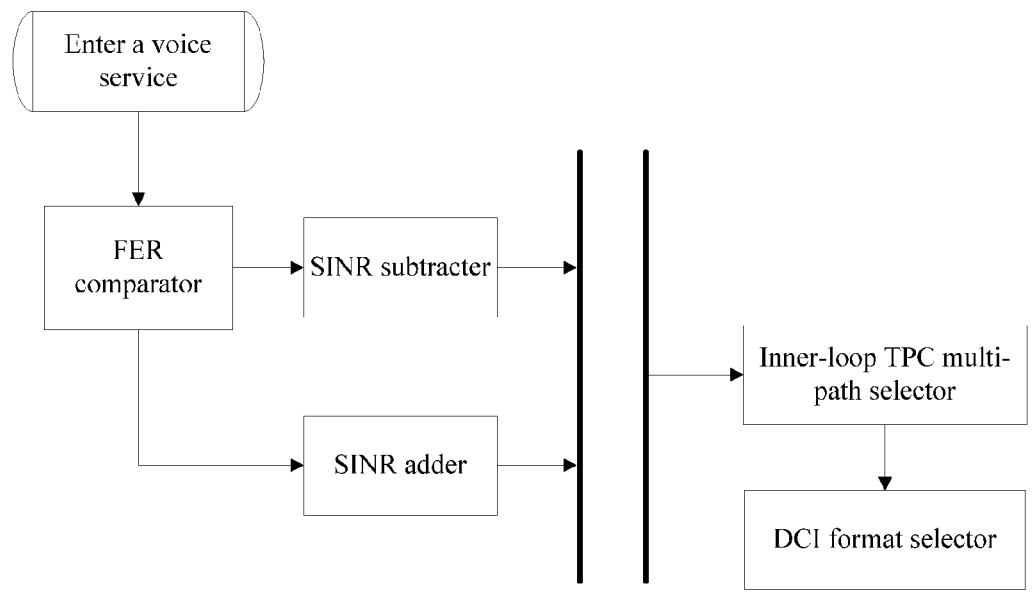
FIG. 8 is a structure diagram of a device for obtaining a current SINR value in an embodiment of the disclosure.

With reference to FIG. 8, in an embodiment, the operation module 60 may only comprise:

a subtracter 61 configured to, when the current service is a voice service and a measured FER value is smaller than the target FER value, subtract the target FER value from the target SINR value; and an adder 62 configured to, when the current service is the voice service and the measured FER value is greater than the target FER value, add the target FER value onto the target SINR value.

The difference value between the current FER value and the target FER value indicates the quality of communication between the UE and the base station, and whether the transmission power of the UE needs to be adjusted. In an embodiment of the disclosure, obtaining the current SINR value through the device for obtaining the SINR value is simple and reliable, and the obtained current SINR value can be used for adjusting the transmission power of the UE. For example, the current SINR value can be compared with the target SINR value required by the service, TPC commands with different bit values can be sent to the UE according to the results of comparison, so that the UE judges whether to increase or decrease the transmission power according to the received TPC command.

The device for obtaining the SINR value in the embodiment can be aimed at the voice service.

In the PUSCH channel, the TPC command selection module 30 may be configured to:

when the PHR value of the UE is greater than 0:

if $\Delta SINR \geq HSINR$, determine the TPC command as 4; when $\Delta SINR \geq HSINR$, it is indicated that an absolute value of the difference value between the current SINR in the channel and the target SINR is greater than or equal to the highest SINR threshold value and the quality of the signal in the channel is relatively poor, therefore a TPC command with a bit value of 4 can be sent to the UE, so that the UE increases the transmission power greatly according to the TPC command;

if $HSINR > \Delta SINR \geq MSINR$, determine the TPC command as 1; when $HSINR > \Delta SINR \geq MSINR$, it is indicated that the absolute value of the difference value between the current SINR in the channel and the target SINR is between the highest threshold value and the median threshold value and the quality of the signal is fair, therefore a TPC command with a bit value of 1 can be sent to the UE, so that the UE increases the transmission power slightly according to the TPC command;

if $MSINR > \Delta SINR \geq LSINR$, determine the TPC command as −1; when $MSINR > \Delta SINR \geq LSINR$, it is indicated that the absolute value of the difference value between the current SINR in the channel and the target SINR is between the lowest threshold value and the median threshold value and the communication is relatively good, therefore a TPC command with a bit value of −1 can be sent to the UE, so that the UE decreases the transmission power according to the TPC command;

if ΔSINR<LSINR, determine the TPC command as −4; ΔSINR<LSINR means that the absolute value of the difference value between the current SINR in the channel and the target SINR is smaller than the lowest threshold value and the signal is relatively strong, therefore a TPC command with a bit value of −4 can be sent to the UE, so that the UE decreases the transmission power according to the TPC command.

Further, the TPC command selection module 30 may be further configured to:

if the PHR value of the UE approaches a maximum limit value, determine the TPC command as 1; if the PHR value of the UE does not approach the maximum limit value, compare the ΔSINR with the SINR value threshold, if ΔSINR≥LSINR, determine the TPC command as −1, if ΔSINR<LSINR, determine the TPC command as −4. When the PHR value is 40, it is indicated that the transmission power of the UE has been very small, approaching to 0, at this moment, the transmission power cannot be adjusted down any more; otherwise, the transmission power can be decreased.

Further, the TPC command selection module 30 may be further configured to:

when the PHR value of the UE is smaller than 0, compare the ΔSINR with the SINR value threshold, if ΔSINR≥LSINR, determine the TPC command as −1, if ΔSINR<LSINR, determine the TPC command as −4.

In the PUSCH channel, the TPC command selection module 30 may be further configured to:

when the PHR value of the UE is greater than 0:

if ΔSINR≥HSINR, judge whether in an uplink power control information transmission state, if it is judged to be in the uplink power control information transmission state, determine the TPC command as 1, if it is judged to be not in the uplink power control information transmission state, determine the TPC command as 3;

if HSINR>ΔSINR≥MSINR, determine the TPC command as 1;

if MSINR>ΔSINR≥LSINR, determine the TPC command as 0;

if ΔSINR<LSINR, determine the TPC command as −1.

Further, the TPC command selection module 30 may be further configured to:

if the PHR value of the UE approaches the maximum limit value, determine the TPC command as 0, if the PHR value of the UE does not approach the maximum limit value, determine the TPC command as −1.

In the PUCCH channel, the TPC command selection module 30 is configured to:

if ΔSINR≥HSINR, determine the TPC command as 3;

if HSINR>ΔSINR≥MSINR, determine the TPC command as 1;

if MSINR>ΔSINR>LSINR, determine the TPC command as 0.

The above contents only describe preferable embodiments of the disclosure and are not used for limiting the disclosure. Any equivalent structures or equivalent flow conversions made by utilizing contents in the specification and drawings, or direct or indirection applications in other related technical fields, should be included in the patent protection scope of the disclosure.

What is claimed is:

1. A method for obtaining a Transmission Power Control (TPC) command, characterized by comprising:

presetting a Signal to Interference plus Noise Ratio (SINR) value threshold;

comparing a current SINR value with a target SINR value to obtain a difference value ΔSINR;

comparing the ΔSINR with the SINR value threshold, and obtaining a TPC command according to a result of comparison;

wherein the current SINR value is obtained according to following steps:

when a current service is a traffic service:

if a measured Frame Error Rate (FER) value is greater than a target FER value, adding the target FER value onto the target SINR value;

if the measured FER value is smaller than the target FER value, separating a Power Headroom Report (PHR) value of User Equipment (UE);

comparing the separated PHR value and a preset target PHR value;

when a current PHR value is greater than the target PHR value, adding the target FER value onto the target SINR value; when the current PHR value is not greater than the target PHR value, subtracting the target FER value from the target SINR value; or the current SINR value is obtained according to following steps:

when a current service is a voice service:

if a measured FER value is smaller than a target FER value, subtracting the target FER value from the target SINR value;

if the measured FER value is greater than the target FER value, adding the target FER value onto the target SINR value.

2. The method according to claim 1, characterized in that the SINR value threshold comprises a highest value HSINR, a median value MSINR, and a lowest value LSINR; obtaining the TPC command according to the result of the comparison comprises:

when a PHR value of UE is greater than 0:

if ΔSINR≥HSINR, determining the TPC command as 4;

if HSINR>ΔSINR≥MSINR, determining the TPC command as 1;

if MSINR>ΔSINR≥LSINR, determining the TPC command as −1;

if ΔSINR<LSINR, determining the TPC command as −4;

if the PHR value of the UE approaches a maximum limit value, determining the TPC command as 1; if the PHR value of the UE does not approach the maximum limit value, comparing the ΔSINR with the SINR value threshold, if ΔSINRLSINR, determining the TPC command as −1, if ΔSINR<LSINR, determining the TPC command as −4;

when the PHR value of the UE is smaller than 0: comparing the ΔSINR with the SINR value threshold, if ΔSINR≥LSINR, determining the TPC command as −1, if ΔSINR<LSINR, determining the TPC command as −4.

3. The method according to claim 1, characterized in that the SINR value threshold comprises a highest value HSINR, a median value MSINR, and a lowest value LSINR; obtaining the TPC command according to the result of the comparison comprises:

when a PHR value of UE is greater than 0:

if ΔSINR≥HSINR, judging whether in an uplink power control information transmission state, if it is judged to be in the uplink power control information transmission state, determining the TPC command as 1, if it is judged to be not in the uplink power control information transmission state, determining the TPC command as 3;

if HSINR>ΔSINR≥MSINR, determining the TPC command as 1;
if MSINR>ΔSINR≥LSINR, determining the TPC command as 0;
if ΔSINR<LSINR, determining the TPC command as −1;
if the PHR value of the UE approaches a maximum limit value, determining the TPC command as 0, if the PHR value of the UE does not approach the maximum limit value, determining the TPC command as −1.

4. The method according to claim 1, characterized in that the SINR value threshold comprises a highest value HSINR, a median value MSINR, and a lowest value LSINR; obtaining the TPC command according to the result of the comparison comprises:
if ΔSINR≥HSINR, determining the TPC command as 3;
if HSINR>ΔSINR≥MSINR, determining the TPC command as 1;
if MSINR>ΔSINR>LSINR, determining the TPC command as 0.

5. The method according to claim 1, characterized in that the SINR value threshold comprises a highest value HSINR, a median value MSINR, and a lowest value LSINR; obtaining the TPC command according to the result of the comparison comprises:
when a PHR value of UE is greater than 0:
if ΔSINR≥HSINR, determining the TPC command as 4;
if HSINR>ΔSINR≥MSINR, determining the TPC command as 1;
if MSINR>ΔSINR≥LSINR, determining the TPC command as −1;
if ΔSINR<LSINR, determining the TPC command as −4;
if the PHR value of the UE approaches a maximum limit value, determining the TPC command as 1; if the PHR value of the UE does not approach the maximum limit value, comparing the ΔSINR with the SINR value threshold, if ΔSINR≥LSINR, determining the TPC command as −1, if ΔSINR<LSINR, determining the TPC command as −4;
when the PHR value of the UE is smaller than 0: comparing the ΔSINR with the SINR value threshold, if ΔSINR≥LSINR, determining the TPC command as −1, if ΔSINR<LSINR, determining the TPC command as −4.

6. The method according to claim 1, characterized in that the SINR value threshold comprises a highest value HSINR, a median value MSINR, and a lowest value LSINR; obtaining the TPC command according to the result of the comparison comprises:
when a PHR value of UE is greater than 0:
if ΔSINR≥HSINR, judging whether in an uplink power control information transmission state, if it is judged to be in the uplink power control information transmission state, determining the TPC command as 1, if it is judged to be not in the uplink power control information transmission state, determining the TPC command as 3;
if HSINR>ΔSINR≥MSINR, determining the TPC command as 1;
if MSINR>ΔSINR≥LSINR, determining the TPC command as 0;
if ΔSINR<LSINR, determining the TPC command as −1;
if the PHR value of the UE approaches a maximum limit value, determining the TPC command as 0, if the PHR value of the UE does not approach the maximum limit value, determining the TPC command as −1.

7. A device for obtaining a Transmission Power Control (TPC) command, characterized by comprising:

a threshold setting module, configured to preset a Signal to Interference plus Noise Ratio (SINR) value threshold;
a difference value obtaining module, configured to compare a current SINR value with a target SINR value to obtain a difference value ΔSINR; and
a TPC command selection module, configured to compare the ΔSINR with the SINR value threshold, and obtain a TPC command according to a result of comparison;
the device for obtaining a TPC command further comprising an adder, a subtracter, a Power Headroom Report (PHR) separator and a PHR comparator, wherein
the adder is configured to, when a current service is a traffic service, if a measured Frame Error Rate (FER) value is greater than a target FER value, add the target FER value onto the target SINR value;
the PHR separator is configured to, when the current service is the traffic service, if the measured FER value is smaller than the target FER value, separate a PHR value of User Equipment (UE);
the PHR comparator is configured to compare the PHR value and a preset target PHR value;
the adder is further configured to, when a current PHR value is greater than the target PHR value, add the target FER value onto the target SINR value; the subtracter is configured to, when the current PHR value is smaller than the target PHR value, subtract the target FER value from the target SINR value; or
the device for obtaining a TPC command further comprising:
a subtracter, configured to, when a current service is a voice service, if a measured FER value is smaller than a target FER value, subtract the target FER value from the target SINR value;
an adder, configured to, when the current service is the voice service, if the measured FER value is greater than the target FER value, add the target FER value onto the target SINR value.

8. The device for obtaining a TPC command according to claim 7, characterized in that the SINR value threshold comprises a highest value HSINR, a median value MSINR, and a lowest value LSINR; the TPC command selection module is configured to:
when a PHR value of UE is greater than 0:
if ΔSINR≥HSINR, determine the TPC command as 4;
if HSINR>ΔSINR≥MSINR, determine the TPC command as 1;
if MSINR>ΔSINR≥LSINR, determine the TPC command as −1;
if ΔSINR<LSINR, determine the TPC command as −4;
if the PHR value of the UE approaches a maximum limit value, determine the TPC command as 1; if the PHR value of the UE does not approach the maximum limit value, compare the ΔSINR with the SINR value threshold, if ΔSINR≥LSINR, determine the TPC command as −1, if ΔSINR<LSINR, determine the TPC command as −4;
when the PHR value of the UE is smaller than 0: compare the ΔSINR with the SINR value threshold, if ΔSINR≥LSINR, determine the TPC command as −1, if ΔSINR<LSINR, determine the TPC command as −4.

9. The device for obtaining a TPC command according to claim 7, characterized in that the SINR value threshold comprises a highest value HSINR, a median value MSINR, and a lowest value LSINR; the TPC command selection module is configured to:

when a PHR value of UE is greater than 0:
if $\Delta SINR \geq HSINR$, judge whether in an uplink power control information transmission state, if it is judged to be in the uplink power control information transmission state, determine the TPC command as 1, if it is judged to be not in the uplink power control information transmission state, determine the TPC command as 3;
if $HSINR > \Delta SINR \geq MSINR$, determine the TPC command as 1;
if $MSINR > \Delta SINR \geq LSINR$, determine the TPC command as 0;
if $\Delta SINR < LSINR$, determine the TPC command as −1;
if the PHR value of the UE approaches a maximum limit value, determine the TPC command as 0, if the PHR value of the UE does not approach the maximum limit value, determine the TPC command as −1.

10. The device for obtaining a TPC command according to claim 7, characterized in that the SINR value threshold comprises a highest value HSINR, a median value MSINR, and a lowest value LSINR; the TPC command selection module is configured to:
if $\Delta SINR \geq HSINR$, determine the TPC command as 3;
if $HSINR > \Delta SINR \geq MSINR$, determine the TPC command as 1;
if $MSINR > \Delta SINR > LSINR$, determine the TPC command as 0.

11. The device for obtaining a TPC command according to claim 7, characterized in that the SINR value threshold comprises a highest value HSINR, a median value MSINR, and a lowest value LSINR; the TPC command selection module is configured to:
when a PHR value of UE is greater than 0:
if $\Delta SINR \geq HSINR$, determine the TPC command as 4;
if $HSINR > \Delta SINR \geq MSINR$, determine the TPC command as 1;
if $MSINR > \Delta SINR \geq LSINR$, determine the TPC command as −1;
if $\Delta SINR < LSINR$, determine the TPC command as −4;
if the PHR value of the UE approaches a maximum limit value, determine the TPC command as 1; if the PHR value of the UE does not approach the maximum limit value, compare the $\Delta SINR$ with the SINR value threshold, if $\Delta SINR \geq LSINR$, determine the TPC command as −1, if $\Delta SINR < LSINR$, determine the TPC command as −4;
when the PHR value of the UE is smaller than 0: compare the $\Delta SINR$ with the SINR value threshold, if $\Delta SINR \geq LSINR$, determine the TPC command as −1, if $\Delta SINR < LSINR$, determine the TPC command as −4.

12. The device for obtaining a TPC command according to claim 7, characterized in that the SINR value threshold comprises a highest value HSINR, a median value MSINR, and a lowest value LSINR; the TPC command selection module is configured to:
when a PHR value of UE is greater than 0:
if $\Delta SINR \geq HSINR$, judge whether in an uplink power control information transmission state, if it is judged to be in the uplink power control information transmission state, determine the TPC command as 1, if it is judged to be not in the uplink power control information transmission state, determine the TPC command as 3;
if $HSINR > \Delta SINR \geq MSINR$, determine the TPC command as 1;
if $MSINR > \Delta SINR \geq LSINR$, determine the TPC command as 0;
if $\Delta SINR > LSINR$, determine the TPC command as −1;
if the PHR value of the UE approaches a maximum limit value, determine the TPC command as 0, if the PHR value of the UE does not approach the maximum limit value, determine the TPC command as −1.

* * * * *

UNITED STATES PATENT AND TRADEMARK OFFICE
CERTIFICATE OF CORRECTION

PATENT NO.        : 9,084,213 B2                                    Page 1 of 1
APPLICATION NO.   : 13/823303
DATED             : July 14, 2015
INVENTOR(S)       : Yuren Wang et al.

It is certified that error appears in the above-identified patent and that said Letters Patent is hereby corrected as shown below:

In the claims

Column 12, Claim 2, Line 48, replace "$\Delta SINRLSINR$" with --$\Delta SINR \geq LSINR$--.

Signed and Sealed this
Twenty-ninth Day of December, 2015

Michelle K. Lee
*Director of the United States Patent and Trademark Office*